United States Patent [19]

Klueber et al.

[11] Patent Number: 4,529,044

[45] Date of Patent: Jul. 16, 1985

[54] ELECTROPNEUMATIC HAMMER DRILL OR CHIPPING HAMMER

[75] Inventors: Wilhelm Klueber, Königsbrunn; Peter Bloeckinger, Neuried; Werner Theissig, Munich, all of Fed. Rep. of Germany

[73] Assignee: Hilti Aktiengesellschaft, Schaan, Fed. Rep. of Germany

[21] Appl. No.: 593,814

[22] Filed: Mar. 27, 1984

[30] Foreign Application Priority Data

Mar. 28, 1983 [DE] Fed. Rep. of Germany ....... 3311265

[51] Int. Cl.3 ........................ B23B 45/02; B25D 15/00

[52] U.S. Cl. .................................... 173/48; 74/22 A; 173/109; 173/116; 408/9

[58] Field of Search ................... 173/47, 48, 104, 109, 173/112, 114, 116, 117, 122; 408/9, 17, 126; 74/22 A

[56] References Cited

U.S. PATENT DOCUMENTS

| | | | |
|---|---|---|---|
| 3,828,863 | 8/1974 | Bleicher et al. | 173/48 |
| 4,158,313 | 6/1979 | Smith | 74/22 A |
| 4,280,359 | 7/1981 | Schmid et al. | 74/60 |

*Primary Examiner*—Frank T. Yost
*Assistant Examiner*—Hien H. Phan
*Attorney, Agent, or Firm*—Toren, McGeady, Stanger, Goldberg & Kiel

[57] ABSTRACT

In an electropneumatic drill or chipping hammer with an air cushion transmitting driving force of an exciter piston to a percussion piston, a clutch is provided to interengage a drive motor with the exciter piston. The clutch can be selectively engaged by an axially displacing holding sleeve which positions a tool on the front end of the drill or hammer.

7 Claims, 3 Drawing Figures

ELECTROPNEUMATIC HAMMER DRILL OR CHIPPING HAMMER

SUMMARY OF THE INVENTION

The present invention is directed to an electropneumatic hammer drill or chipping hammer with an air cushion located between an exciter piston and a percussion piston transmitting the driving force of the exciter piston to the percussion piston and a drive motor can be connected to the exciter piston by a clutch actuated from the outside of the drill or hammer.

A known hammer drill includes a switch, actuated on the outside of the drill, so that the drill can be selectively arranged for rotary drilling or combined rotary and percussion drilling. The switch actuates a mechanical coupling arranged between the exciter piston of the percussion mechanism and a drive motor. In one position of the clutch, the exciter piston is interconnected with the drive motor while in another position the interconnection is interrupted.

In the connected position, with the drive motor running, the exciter piston continues to reciprocate so that the stroke of the exciter piston is transmitted via the air cushion to the percussion piston. As a result, the percussion piston impinges directly or indirectly during its forward stroke on a tool held in a chuck on the hammer drill. If the hammer drill is pressed against a material to be worked, the percussion energy is transferred to the material being worked. If the tool in the hammer drill does not make contact with the material, the blows transmitted to the tool must be absorbed by the components forming the hammer drill. Such "idle" blows quickly result in damage to the hammer drill.

Therefore, it is the primary object of the present invention to assure that in a hammer drill or chipping hammer of the above-mentioned type, that the clutch interconnects the exciter piston and the drive motor only when the tool makes contact with the material to be worked.

In accordance with the present invention the clutch is actuated or engaged by a holding sleeve axially displaceable by a tool mounted in the sleeve or by a part of the chuck which includes the sleeve.

To actuate the clutch, the tool mounted in the holding sleeve is pressed against the material to be worked. The force generated by such pressing action displaces the holding sleeve and engages the clutch parts. Preferably, the holding sleeve is maintained in the position with the clutch disengaged by spring means. The displacement of the holding sleeve into the position for engaging the clutch takes place counter to the biasing action of the spring means. The clutch can be designed in the conventional manner, such as a jaw clutch.

The particular advantage of this arrangement is that when the tool is not pressed against the material to be worked, the clutch is disengaged and consequently the exciter piston does not reciprocate back and forth and transfer the driving force to the percussion piston. Accordingly, idle blows are not developed in the drill or hammer.

Preferably, the holding sleeve is a part of the chuck for holding a tool on the drill. The tool is retained in the holding sleeve so that it cannot be moved in the axial direction or so that only limited movement can be effected. The axial displacement of the tool when it is pressed against the material to be worked, is transmitted to the holding sleeve which, in turn, moves the clutch into the engaged position.

Transmitting the sliding movement of the holding sleeve to the clutch can be effected, for example, by a linkage. It is advantageous, however, if the holding sleeve is formed as a unit with a hollow shaft which transmits the rotary drilling movement to the tool. Due to the unitary construction of the holding sleeve and the hollow shaft, the hollow shaft affords the direct connection with the clutch so that it can be engaged.

To switch a hammer drill from percussion drilling operation to rotary drilling only, the axial displacement of the holding element for providing clutch engagement is suppressed. To limit the displacement of the holding sleeve, it is preferable if a stop member is provided. The stop member may be located on the holding sleeve or in the drill housing. A suitable arrangement would be a latch or similar member which can be moved into the displacement path of the holding sleeve.

In another embodiment, the stop member can be formed as a projection which moves through a recess to effect clutch engagement. By blocking movement of the projection, the clutch remains in the disengaged position. The projection can be located on the holding sleeve or on a part fixed to it. The projection may extend radially relative to the holding sleeve and also be movable axially, that is, in the pressing direction for effecting clutch engagement. The size of the recess to which the projection extends is appropriately slightly larger than the projection so that the movement of the projection in clutch engagement can be ensured.

Another feature of the invention is that one of the projection or the member in which the recesses are formed are rotatable relative to the other. It has proven to be advantageous to fix the projection to the holding sleeve so that it cannot be rotated in the housing and to provide the recess in a ring rotatably mounted in the housing and accessible from the outside of the housing.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figures 1, 2, 3:
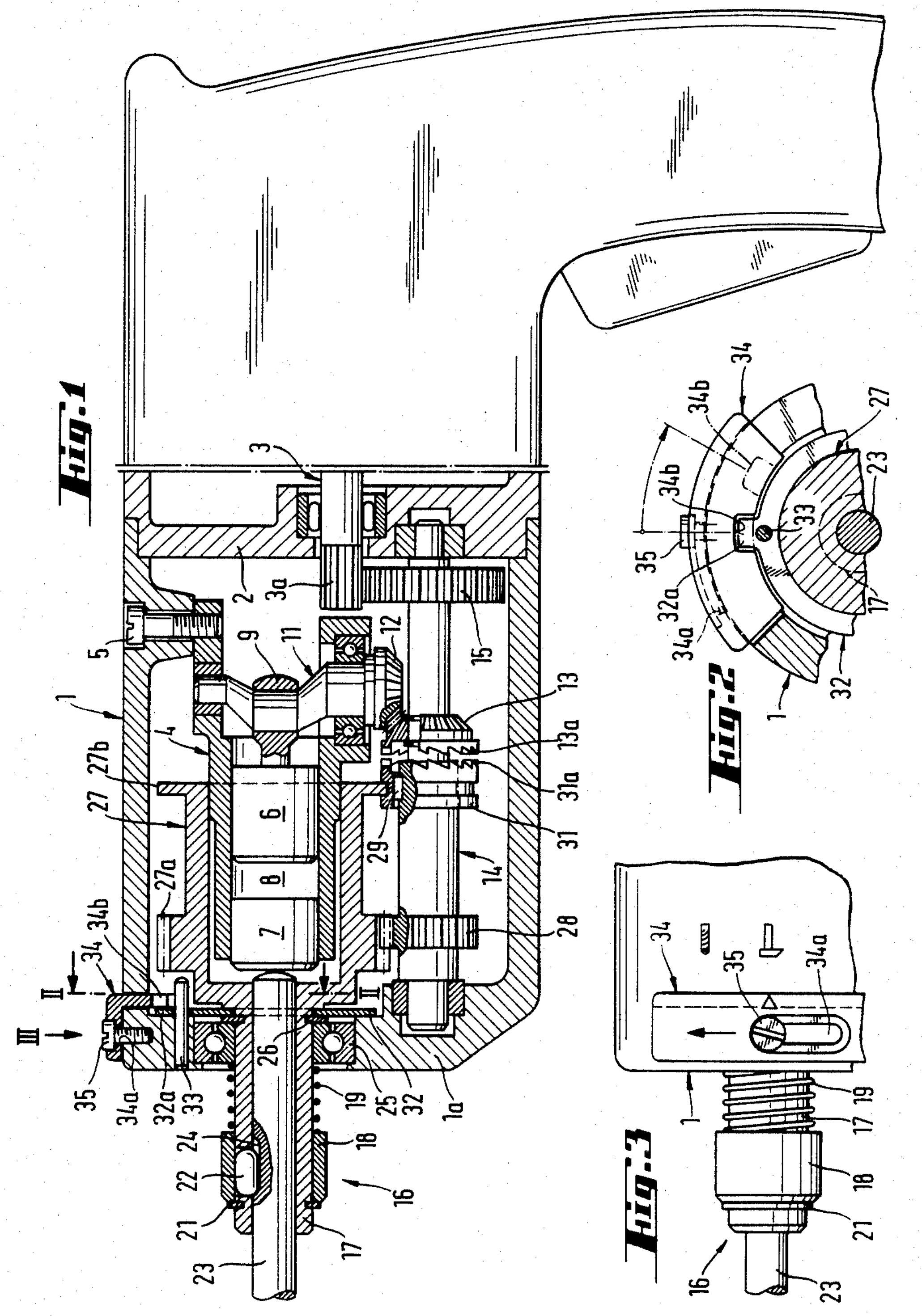
FIG. 1 is a hammer drill set in the inoperative position for percussion drilling and shown partly in section.
FIG. 2 is a partial sectional view of the hammer drill taken along the line II—II in FIG. 1.
FIG. 3 is a partial view of the hammer drill taken in the direction of the arrow III in FIG. 1.

The hammer drill illustrated in FIG. 1 includes a housing 1 with its front end at the left end and its rear end at the right end. A rear bearing support 2 is located within the housing intermediate the front and rear ends. A rotor shaft 3 of a drive motor located in the rear end of the housing, but not illustrated, extends through the rear bearing support 2. Within the housing between its front end and the rear bearing support 2, a guide cylinder 4 is fixed to the housing by a bolt 5. The guide cylinder has its axis extending in the front end-rear end direction of the housing. An exciter piston 6 is slidably supported within the guide cylinder 4 rearwardly from a percussion piston 7 also slidable displaceably mounted in the guide cylinder. The exciter piston 6 and the percussion piston 7 are spaced axially apart so that an air cushion 8 is formed between them. As the exciter piston is reciprocated within the guide cylinder its driving force is transmitted via the air cushion 8 to the percussion piston 7. The exciter piston 6 is driven by a connecting rod 9 mounted on a crank shaft 11. The crank shaft is mounted in two bearings each located on the opposite sides of the rear end of the guide cylinder 4.

A bevel gear 12 is secured to the crankshaft 11 for transmitting rotational movement to the crankshaft. The bevel gear 12 meshes with a bevel gear 13 freely rotatably mounted on a countershaft 14. The countershaft is mounted at its front end in the front end of the housing and at its rear end within the rear bearing support 2. Adjacent its rear end, the countershaft has a gear 15 which is in meshed engagement with a pinion 3*a* on the front end of the rotor shaft so that the driving force from the drive motor is transmitted through the gear 15 to the countershaft 14.

The front end of the housing 1 forms a front bearing support 1*a* and a tool chuck 16 is mounted in and extends outwardly from the front bearing support. The tool chuck 16 includes an axially extending holding sleeve 17, a support ring 18 laterally enclosing the holding sleeve at a position spaced forwardly of the front bearing support 1*a* and the rear end of the support ring is held by a compression spring 19 and it is pressed against a lock ring 21 fitted into the outside surface of the sleeve 17. A plurality of locking rollers 22 are located within axially extending slots in the holding sleeve 17. The locking rollers secure a tool 23 in the chuck 16 with the roller extending into recesses 24 formed in the shank of the tool. The release of the locking rollers from engagement with the recesses in the tool so that the tool can be removed from the chuck is a conventional feature involving relative rotation of the ring 18 and the holding sleeve 17. The chuck is rotatably mounted in the front bearing support 1*a* by a ball bearing 25. The ball bearing 25 is axially fixed in the front bearing support so that the holding sleeve can be moved axially inwardly relative to the front bearing support. The ball bearing 25 is held between the compression spring 19 on its front side and a ring 26 fitted into the outside surface of the holding sleeve 17 on its rear side.

Within the housing 1, a hollow shaft 27 having a larger inside diameter than the inside diameter of the sleeve 17 is formed as a unit with the sleeve. The hollow shaft 27 extends rearwardly within the housing over the guide cylinder 4 and it is in sliding contact at its rear end with the guide cylinder. The rim 27*a* of a gear is formed on the outside surface of the hallow shaft 27 and is in meshed engagement with a gear fixed to rotate with the countershaft 14. Note that the axial length of the teeth in the rim 27*a* is greater than the axial length of the gear 28. The tool is rotated by the rotor shaft 3 of the drive motor through the pinion 3*a*, the gear 15, the countershaft 14 and the gear 28 which drives the rim 27*a* and, in turn, the hollow shaft 27.

On the countershaft 14 between the gear 28 and the bevel gear 13 there is a clutch plate 31, with spur gear teeth 31*a*, fixed on the countershaft so that it rotates as a unit with the shaft, however, the clutch plate 31 is axially displaceable by a key 29. Matching spur gear teeth 13*a* are formed on the bevel gear 13. In the inoperative position of the hammer drill, the clutch plate 31 is held out of engagement with the bevel gear 13, as shown in FIG. 1. The clutch plate 31 is held in the position by a driver rim 27*b* formed on the rear end of the hollow shaft 27 so that it engages in the clutch plate 31. The driver rim 27*b* along with the unitary hollow shaft 27 and holding sleeve 17 is held in the forwardly displaced position by the compression spring 19.

When the hammer drill with the tool 23 inserted into the chuck 16 is pressed against a material to be worked, not shown, the tool presses the holding sleeve 17 in the direction into the housing 1 against the compression spring 19 due to the interconnection between the tool and the holding sleeve provided by the locking rollers 22. Since the hollow shaft if formed as a unit with the holding sleeve, the movement of the sleeve is transmitted by the hollow shaft to the integral driver rim 27*b* and the clutch plate 31, rotating with the countershaft 14, is moved into engagement with the bevel gear 13. As a result of such engagement of the clutch, the bevel gear 13 transmits rotational movement to the bevel gear 12 which, in turn, rotates the crankshaft 11. As the crankshaft 11 rotates, the connecting rod 9 mounted on the crankshaft imparts the stroke-like reciprocating movement to the exciter piston 6. As a result, as the exciter piston moves back and forth within the guide cylinder 4, its movement is transmitted to the percussion piston 7 over the air cushion 8 so that the percussion piston impacts against the rear end face of the tool 23 extending into the housing 1 through the holding sleeve 17.

When the holding sleeve 17 is moved rearwardly or into the housing 1, a disk 32 encircling the rear end of the sleeve between the ring 26 and the front end of the hollow shaft 27 is moved by the ring 26. Disk 32 is fixed in the front bearing support 1*a* of the housing 1 by a pin 33 which extends through the front bearing support and the disk. At the front end of the housing 1, on the upper part of the front bearing support 1*a*, as viewed in FIG. 1, a projection 32*a* extends upwardly from the otherwise rounded disk 32. Note the projection 32*a* on the disk in FIG. 2. In addition, a selector slide 34 is mounted on the front end of the housing upwardly from the projection 32*a* and the slide can effect limited sliding motion relative to the axis of the housing. The slide is held for its limited sliding motion by a screw 35 which extends through a slot 34*a* in the slide 34, note FIG. 3, and is connected into the front bearing support 1*a* of the housing 1. The slide 34 is L-shaped in cross-section, note FIG. 1, so that one leg extends inwardly through the housing into the path of movement of the projection 32*a*. The inwardly projecting leg of the slide 34 has a cutout 34*b* aligned with the projection 32*a* in the position shown in FIGS. 1 and 2.

As the holding sleeve 17 is pressed inwardly into the housing 1 for effecting the engagement of the clutch, the projection 32*a* passes through the cutout 34*b* in the slide 34. FIGS. 2 and 3 illustrate the position of the hammer drill when it is arranged to perform percussion drilling.

For converting the hammer drill to rotational drilling, the selector slide 34 is moved in the direction of the arrows shown in FIGS. 2 and 3. As a result, the cutout 34*b* in the slide 34 is moved out of alignment with the projection 32*a* blocking any movement of the projection and the holding sleeve in the rearward direction of the housing. Accordingly, since the holding sleeve 17 cannot be moved inwardly, because the projection 32*a* is blocked by the inwardly projecting leg of the selector slide 34, the clutch plate is maintained out of engagement with the bevel gear 13 and the exciter piston cannot be driven. Accordingly, when the hammer drill is converted to rotational drilling the exciter piston does not effect any idle blows.

While specific embodiments of the invention have been shown and described in detail to illustrate the application of the inventive principles, it will be understood that the invention may be embodied otherwise without departing from such principles.

We claim:

1. Electropneumatic hammer drill or chipping hammer comprising a housing having a front end, a rear end and an axis extending in the front end-rear end direction, a percussion piston located within said housing and displaceable in the axial direction of said housing, an exciter piston located within said housing displaceable in the axial direction of said housing and aligned with said percussion piston with said exciter piston located closer to the rear end of said housing than said percussion piston and spaced from said percussion piston, an air cushion formed between said exciter piston and said percussion piston, a drive motor located within said housing, means mounted in the front end of said housing for holding a tool to be operated by said drive motor, means for interconnecting said drive motor and said exciter piston for reciprocating said exciter piston, said means for interconnecting including a clutch, and said means for holding a tool including a sleeve supported in the front end of said housing and said sleeve being axially displaceable within said housing and engageable with said clutch for selectively engaging said clutch.

2. Electropneumatic hammer drill or chipping hammer as set forth in claim 1, wherein said sleeve is a holding sleeve for securing a tool in the hammer drill or chipping hammer.

3. Electropneumatic hammer drill or chipping hammer as set forth in claim 2, wherein said holding sleeve includes a unitary hollow shaft located within said housing with said shaft arranged to transmit rotary movement to a tool mounted in said holding sleeve.

4. Electropneumatic hammer drill or chipping hammer as set forth in claim 1, wherein stop means are mounted on said housing for blocking the axial displacement of said holding sleeve and thereby preventing the engagement of said clutch.

5. Electropneumatic hammer drill or chipping hammer as set forth in claim 4, wherein said stop means comprises a first member forming a projection and a second member forming a recess through which said projection can pass for permitting the axial displacement of said holding sleeve for engaging said clutch.

6. Electropneumatic hammer drill or chipping hammer as set forth in claim 5, wherein one of said first member and second member is movable relative to the other whereby said projection and said recess are displaced out of alignment so that said second member blocks the movement of said projection and thereby blocks the movement of said holding sleeve for effecting the engagement of said clutch.

7. Electropneumatic hammer drill or chipping hammer, as set forth in claim 1, wherein said housing comprises a rear bearing support located between the front and rear-ends thereof and a front bearing support located at the front end thereof, a rotor shaft extending through said rear bearing support into the space between said rear bearing support and said front bearing support, a countershaft located in the space within said housing between said rear bearing support and said front bearing support, a gear fixed to said countershaft and engageable with a pinion on said rotor shaft, said clutch is located on said countershaft and includes a bevel gear freely rotatable on said countershaft and a clutch plate fixed to said countershaft, said holding sleeve includes a hollow shaft formed as a unit with said holding sleeve and located within and extending in the axial direction of said housing, an annular rim located on the rear end of said hollow shaft within said housing and engageable with said clutch plate, said clutch plate being axially displaceably movable on said counter shaft, a second gear secured on said countershaft and a gear rim formed on the outside surface of said hollow shaft with said second gear in meshed engagement with said gear rim for rotating said hollow shaft and said holding sleeve for transmitting rotational movement to a tool positioned within the holding sleeve, a slide member mounted on said housing adjacent the front end thereof, said slide member being movable transversely of and relative to the axis of said housing, means mounted on said holding sleeve and forming a projection thereon, said slide having an opening therethrough to permit said projection to move along with said holding element for engaging said clutch, and said slide being movable for blocking the movement of said projection and said holding sleeve, and means for biasing said holding sleeve outwardly from the front end of said housing for maintaining said holding sleeve in a position so that said clutch is disengaged.

* * * * *